(No Model.)

A. H. STRICKLER, J. PHILIPS & A. STOUFFER.
PORTABLE FRUIT DRIER.

No. 414,458. Patented Nov. 5, 1889.

ON LINE X—X

ON LINE Y—Y

WITNESSES
Sidney P. Hollingsworth
Wm. L. Kennedy

INVENTORS
Abraham H. Strickler
John Philips
Amos Stouffer
By P. T. Dodge, Attorney

UNITED STATES PATENT OFFICE.

ABRAHAM H. STRICKLER, JOHN PHILIPS, AND AMOS STOUFFER, OF WAYNESBOROUGH, PENNSYLVANIA, ASSIGNORS TO THE AMERICAN MANUFACTURING COMPANY, OF SAME PLACE.

PORTABLE FRUIT-DRIER.

SPECIFICATION forming part of Letters Patent No. 414,458, dated November 5, 1889.

Application filed September 8, 1886. Serial No. 212,984. (No model.)

*To all whom it may concern:*

Be it known that we, ABRAHAM H. STRICKLER, JOHN PHILIPS, and AMOS STOUFFER, of Waynesborough, in the county of Franklin and State of Pennsylvania, have invented certain Improvements in Portable Fruit-Driers, of which the following is a specification.

The aim of this invention is to provide a light inexpensive drier adapted for use on ordinary cook-stoves, ranges, furnaces, or other suitable heaters; and to this end it consists of a skeleton frame mounted on a sheet-metal base and provided with a series of removable pervious trays and with a damper for controlling the currents of hot air, all as hereinafter described, and specified in the claims.

Figure 1:
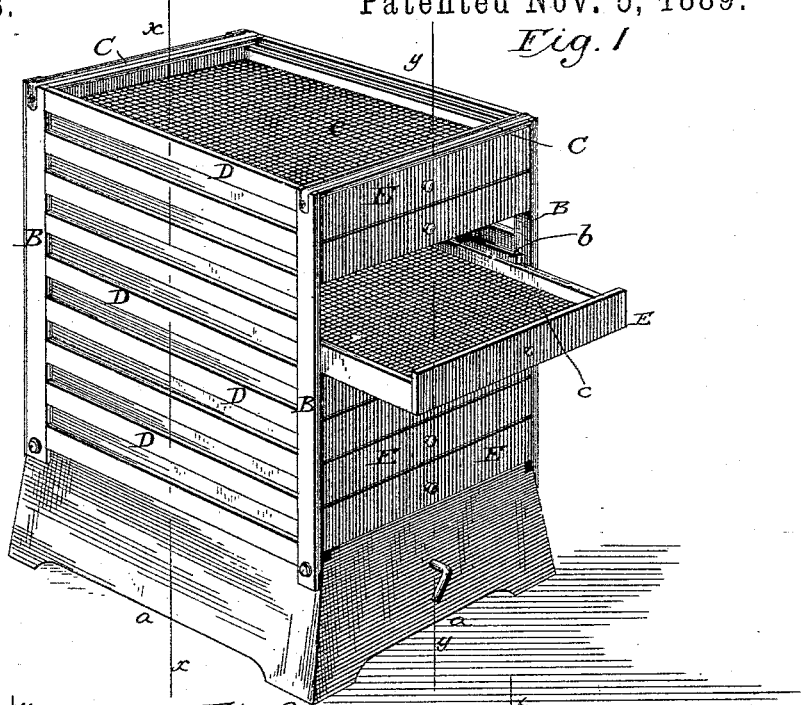
Figure 2:
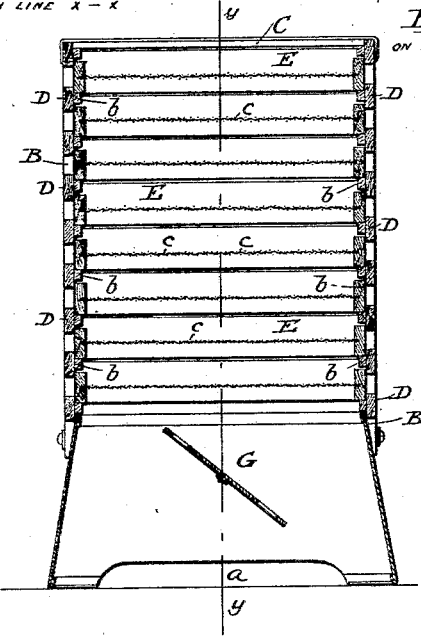
Figure 3:
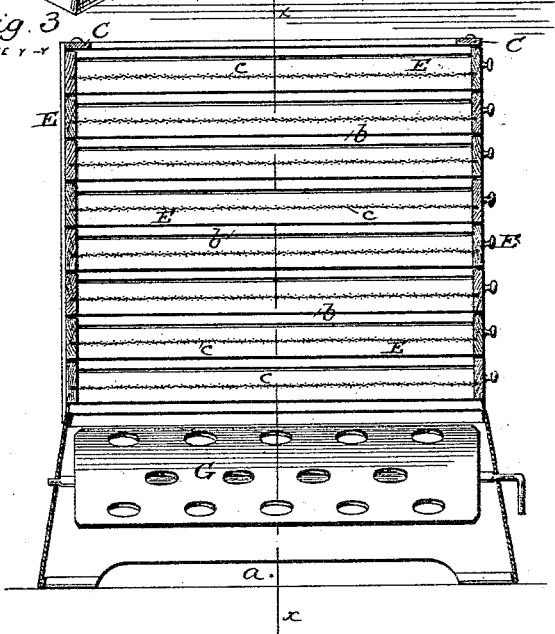

In the accompanying drawings, Figure 1 represents a perspective view of our improved drier. Figs. 2 and 3 are vertical cross-sections of the same on the lines $xx$ and $yy$, respectively.

In constructing the apparatus we first provide a sheet-metal base-frame of rectangular form having its walls inclined or flared outward at the bottom and perforated or cut away in such manner as to leave air-inlets $a$. On the four corners of this base-frame, which is open at its top and bottom, we secure four upright posts B, connected at their top by cross-bars C, and also connected longitudinally by a series of side bars D, the several parts being tenoned, screwed together, or otherwise firmly united. It will be observed that horizontal spaces or openings exist between the side bars D, and that each bar is provided on its inner face with a horizontal rib or shoulder $b$, which serves to support the trays.

E E represent the trays, each consisting of a rectangular wooden frame containing a porous bottom $c$, of woven wire, perforated sheet metal, or equivalent material adapted to permit the free passage of the air-currents therethrough. These trays are adapted to slide endwise into the frame upon and between the shoulders $b$. At the ends the trays are of greater vertical width than at the sides and are so proportioned and arranged that they fit closely together one upon another, closing completely the ends of the frame. The side spaces between the bars D are closed by the side bars of the trays, which thus form, jointly with the bars D, the wall or side of the drier. The top of the body is left open or simply covered with wire-cloth or mosquito-netting in order to permit the free escape of the moisture-laden air and exclude insects.

In the bottom of the apparatus we mount on horizontal pivots a flat deflector or valve G, extending from one end to the other, with a crank or handle at one end, by which it may be turned to a horizontal, a vertical, or any intermediate position. This valve is provided with perforations, as shown. Its office is to assist in distributing and deflecting the ascending currents of heated air and to drive the same to one side or the other of the apparatus, as occasion may require.

In using the apparatus it is seated on top of an ordinary cook-stove, range, furnace, or other suitable heater, or mounted on a special furnace, the trays filled with fruit or other material and inserted, as shown in the drawings. Air flowing inward through the openings $a$ ascends through the series of trays and escapes at the top. The trays are made of uniform size, so that they may be readily transposed or arranged in the apparatus as the condition of the fruit at the different elevations may demand. The perforated bottom is fixed midway between the upper and lower edges of the tray, which is formed so that it may be inserted either side up, as preferred.

Owing to the existence of openings between the side bars D, it is only necessary to remove one or another of the trays in order to admit air into the apparatus at any point required. In the treatment of certain materials this will be found very advantageous.

Having thus described our invention, what we claim is—

1. In a fruit-drier, a skeleton frame provided with longitudinal side supporting-bars and a series of trays, each consisting of a frame and a porous bottom, the said trays combined with the said side bars to form continuous side walls, and the end pieces of the trays forming the continuous end walls of the drier, substantially as described.

2. In a fruit-drier, the combination of the skeleton frame having corner-posts B, side bars D, with shoulders b, and the trays consisting of a frame with the ends of greater vertical width than the sides, and a pervious bottom, substantially as and for the purpose specified.

3. In a fruit-drier, the combination of the skeleton frame and the trays formed of a frame with the end pieces of greater vertical width than the side-pieces, and a pervious bottom fixed midway between the upper and lower edges of the tray, substantially as and for the purpose specified.

In testimony whereof we hereunto set our hands, this 2d day of August, 1886, in the presence of two attesting witnesses.

ABRAHAM H. STRICKLER.
JOHN PHILIPS.
AMOS STOUFFER.

Witnesses:
   JNO. M. WOLFF,
   ALF. N. RUSSELL.